Patented Mar. 1, 1938

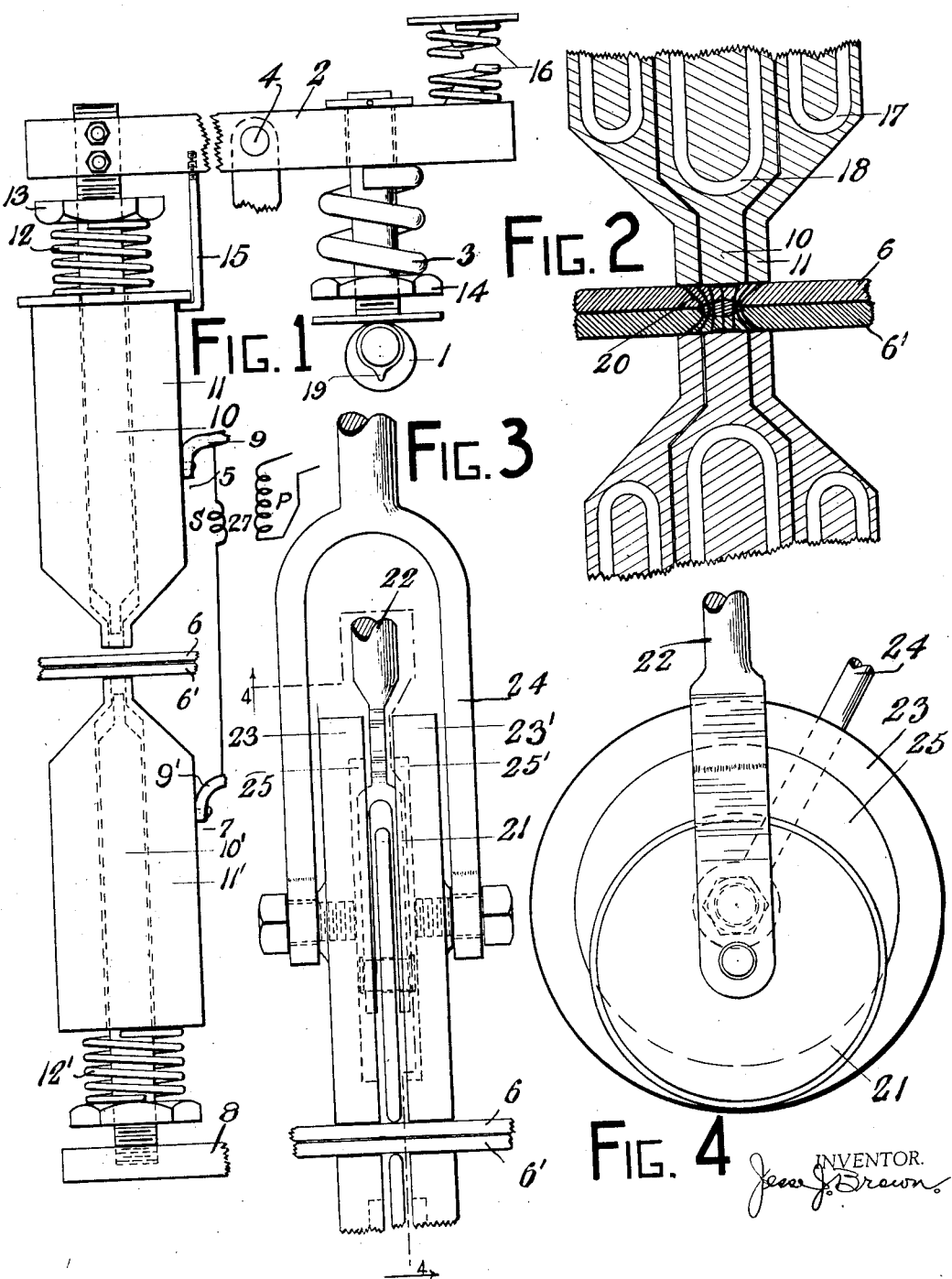

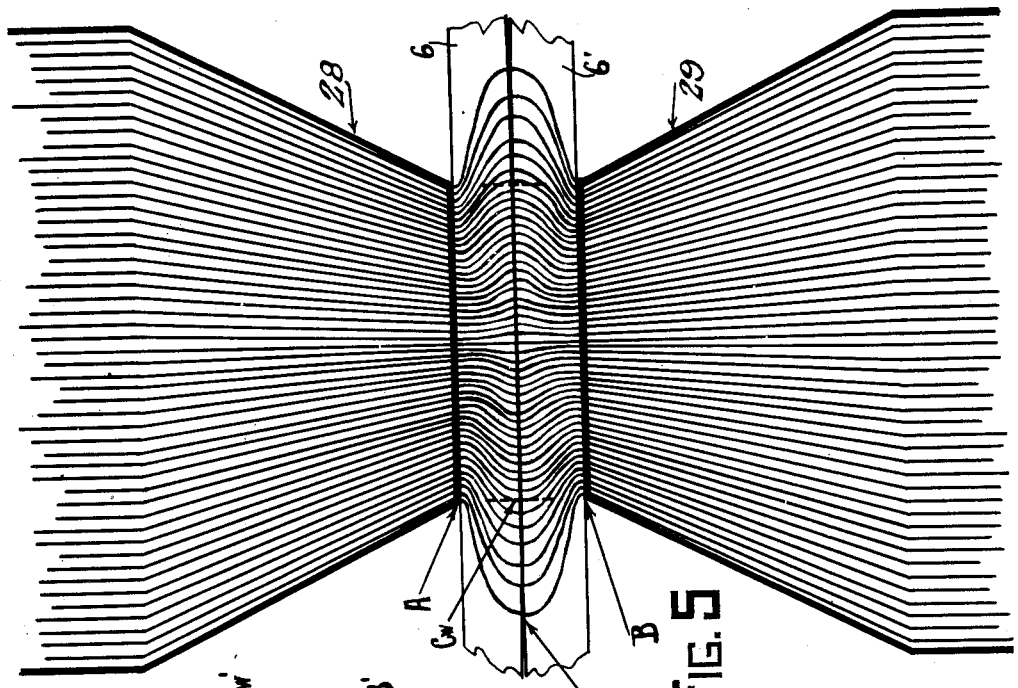
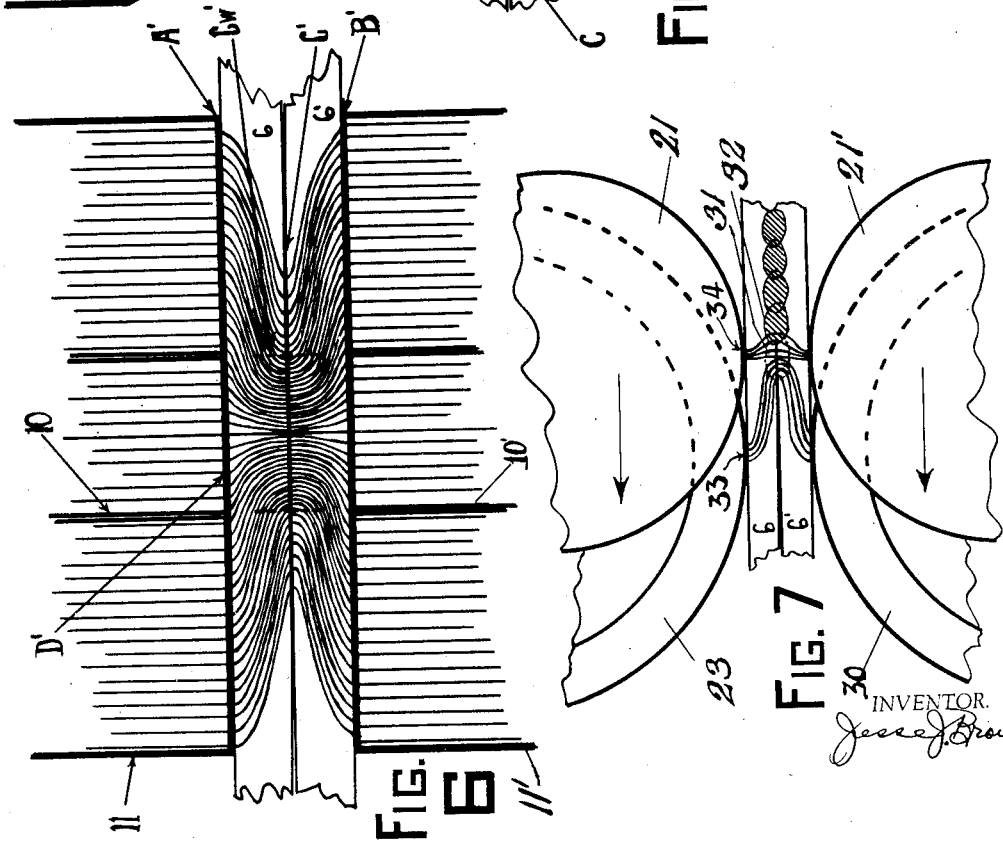

2,109,461

UNITED STATES PATENT OFFICE 2,109,461

RESISTANCE WELDING METHOD

Jesse J. Brown, Syracuse, N. Y.

Application July 17, 1936, Serial No. 91,151

12 Claims. (Cl. 219—10)

This invention relates to an improved method of electric resistance welding, particularly the welding of materials having low electrical resistance, such as aluminum.

In resistance welding, the welding heat is generated by passing a heavy electric current thru the pieces to be welded together, the greatest heat being generated at the point in the circuit which has the highest resistance, which is usually between the surfaces of the parts being welded and at that point at which they are pressed firmly together. The heavy current necessary is usually furnished by the secondary of a step-down transformer.

The electrodes carrying current to the work must of necessity be of a material having a high electrical conductivity, usually copper, in order to readily handle the heavy currents involved. Such material is relatively soft and tends to mushroom under production conditions, due to the combination of heat and mechanical pressure.

In welding steel, the resistance of the joint between the pieces of steel is much greater than that of the joint between the copper electrode and the steel and the heating effect is therefore satisfactorily localized at the former place. However, when welding such low resistance metals as aluminum, the resistance of the joint between the pieces of aluminum is much lower than in the case of steel, almost as low as the joint between the copper electrode and the aluminum, and the problem of localizing the heat between the aluminum pieces becomes a serious one.

With such materials as copper, brass, aluminum, etc., much heavier welding currents must be used than for like pieces of steel, due to the high electrical and thermal conductivities of these metals, and these current values are further increased by the well-known need for welding such metals in extremely short time. Thus the welding currents required to give satisfactory results are very heavy, and because the electrodes are usually of sharply reduced cross-section at their point of contact with work, the current densities at these points are extremely high and the resulting heating there has been the cause of much trouble, particularly the distortion and enlarging of the electrode face area.

Maintaining the size and shape of the electrode tip is very important in obtaining consistent results in the quality of the welds. This is accomplished in this method thru reduction of the electrical resistance of this junction by spreading the electrical contact over a substantially larger area than in previous practice while the forging pressure is confined to a relatively small area as before.

In view of the well-known practice in special cases of backing up one side of the work with a block type electrode, it is obvious this method may at times be applied to only one side of the work, or to only one pole of the circuit.

One object of this invention is to overcome the excessive heating at this junction between the electrode and the work, and the mushrooming of the electrode.

Another object of this invention is to permit the making of spots as small as desired without the difficulties of excessively high current densities at the electrode contact with the work.

Still another object is, in line welding, to reduce the percentage of current which by-passes back thru the adjacent previously welded spot, and thus reduce the total current necessary.

Other objects are obvious, as the reduction in heating at the work-electrode junction will reduce the tendency to oxidation and softening of both materials and may permit dispensing with water cooling in some cases.

The accompanying drawings show an arrangement for carrying part of the welding current around this junction and to lighten the pressure on the soft copper parts.

In the drawings, Fig. 1 shows a side view of such operating parts of a spot-welding machine as pertain to the invention, with the electrodes in the normal or inoperative position. Fig. 2 is an enlarged view in cross-section of the electrode tips of Fig. 1 while in the operating position, and shows the path of the welding current thru the work. Fig. 3 shows an end view of a pair of line or seam welder electrodes, (one in part only) adapted to use the invention. Fig. 4 is a side view of the upper electrode of Fig. 3 partly cut away.

Figs. 5 and 6 are diagrams of the current paths and densities when welding with the conventional method and when using this invention, respectively. These figures are drawn to scale that they may readily be compared with each other, and 49 lines are shown in each one to indicate the current, taken arbitrarily at 20,000 amperes. These two figures, while assumed to be in diametrical section thruout, are not cross-hatched in order that the current lines might be more clearly shown. Fig. 7 is an enlarged variation of the arrangement shown in Fig. 4, and illustrates how the auxiliary current carrying means may be advanced slightly ahead of the forging pressure means when line welding.

In Fig. 5, the tip of the upper electrode 28 is shown contacting the work 6 at junction A with a diameter of ⅛". The lower electrode in each of Figures 5 and 6 is assumed to be identical with the upper electrode in each case, as shown, tho this is not requisite. In Fig. 5, all of the 20,000 amperes must pass thru junction A and the current density, evenly distributed will be 1,629,991 amperes per square inch. The work pieces 6 and 6' are pressed together by the forging pressure exerted by the electrodes 28 and 29, and the resulting contact at junction C, effective for current flow, is naturally of greater area than the pressure area at A, and the average current density at C will therefore be less than the density at A. This is the direct opposite of what is desired.

In Fig. 6, 20,000 amperes are presumed to flow as in Fig. 5, but the electrode contact with work at junction A', effective for current flow, is of much greater area than in the case of Fig. 5, being ¼" in diameter, and the current density, evenly distributed, is proportionately lower, 407,414 amps. p. s. i. This of course greatly reduces the heating effect at junction A' as compared with the heating effect at junction A in Fig. 5, and this is greatly to be desired for several well known reasons. Also, in Fig. 6, the forging pressure area is changed, being reduced to $\frac{1}{16}$" in diameter as at D', and the contact area at C' effective for current flow is thereby reduced. Naturally the current density at C' is correspondingly increased. This is the condition desired in all ordinary spot and line welding, low current density at the electrode contact with work and high current density at the contact between the work pieces.

Some of the values used in connection with the areas C and Cw in Fig. 5, and areas C' and Cw' in Fig. 6, are approximate and are assumed for purposes of comparison only. In Fig. 5 it is assumed that the area at junction C which is effective for current flow is 70% greater in diameter than the forging pressure area at A, both of which are determined by the area of the tip of electrode 28. In Fig. 6 it is assumed that the area at junction C' which is effective for current flow is 90% greater in diameter than the forging pressure area at D', both of which are determined by the area of the tip of electrode core 10, allowance here being made for an increased percentage of contact over the forging pressure area at D' which will naturally result from the contour of the work and because some pressure is exerted on work by the electrode shell 11.

It is also assumed in these two figures that the contact at those parts of C and C' which are directly under the forging pressure areas, and which are designated Cw and Cw' respectively, is substantially firm and uniform and that the degree of contact then gradually decreases outwardly from these areas. It is then assumed, for comparison, that, while the average current density with 20,000 amperes at junction C Fig. 5 is 563,856 amps. p. s. i., the density at Cw is 1,000,000 amps. p. s. i. or about ⅝ of the density at the forging pressure area at A. Likewise, in Fig. 6, 20,000 amperes current would give a current density of 1,806,684 amps. p. s. i. average, in the contact area of junction C' and assuming that the current density at Cw' will be only ½ of the density at the forging pressure area D' (if the entire 20,000 amperes passed thru D') instead of ⅝ as in Fig. 5, the current density at Cw' will be 3,259,452 amps. p. s. i. While contact areas of C' and Cw' are proportional to the forging pressure area D', the current contact area at A' is much greater, and, assuming the current evenly distributed, 20,000 amperes will give a density at A' of only 407,414 amps. p. s. i.

The following table gives a direct comparison of the above areas and current densities—

| Fig. 5 | Area | Cur. Den. |
|---|---|---|
| | (Sq. in.) | (Amps. p. s. i.) |
| A | .01227 | 1,629,991 |
| B | .01227 | 1,629,991 |
| C | .03547 | 563,856 |
| Cw | .01227 | 1,000,000 |

| Fig. 6 | Area | Cur. Den. |
|---|---|---|
| | (Sq. in.) | (Amps. p. s. i.) |
| A' | .04909 | 407,414 |
| B' | .04909 | 407,414 |
| C' | .01107 | 1,806,684 |
| Cw' | .003068 | 3,259,452 |
| D' | .003068 | 6,518,904 |
| (if 20,000 amps. passing thru) | | |

If 1,000,000 amperes density will make a weld at Cw in Fig. 5, the same density is about right for a weld in the area Cw' of Fig. 6, and reducing the density at Cw' to 1,000,000 amps. would be proportional to a density of 2,000,000 amps. p. s. i. at the forging pressure area D', and this would call for a current in the circuit of only 6136 amperes as compared with 20,000 amperes with the old method. If this current of 6136 is distributed evenly over the area A' as shown in Fig. 6, the current density at this junction is only 124,994 amps. p. s. i.

Thus a much lower current and energy input would be sufficient to make the weld, and a much smaller capacity machine would be capable of making the weld, than with the older method. It is assumed, of course, that all of the welds here compared are made with the same forging pressure, the same "dwell" of the current, say 1/60 second, and with accurate synchronous control.

It has been the practice in the past to use many electrode tips with slightly rounded surfaces where they bear on work, this giving a very small area of contact to start with and permitting an increasing area of contact as the work surface softens and the tip sinks into same, the increasing contact reducing the current density at the tip and otherwise favorably affecting the electrical characteristics of the operation. With modern control of resistance welding the time of "dwell" of the current is so extremely short that the current is switched "off" before the electrode has time to move downward into the work and any advantage from this action due to the curved tip is therefore lost, while the disadvantages of the indentation of the work are still present. It is therefore contended that with the method disclosed herein, the outer surfaces of work can be maintained relatively cold and therefore will not soften and allow the electrode to indent the work, and flat electrodes may be used for both spot and line welding.

When seam or line welding with this method, it is possible to advance the auxiliary current carrying rollers 23 and 30, Fig. 7, a slight distance ahead of the forging pressure rollers 21 and 21' and thus reduce the amount of current tending to by-pass back thru the spot just previously welded. In the past, this by-passing has necessitated using much heavier total current in the circuit in order to get the required density at the spot being welded. As may be seen in Fig. 7, the tendency for the current introduced at point 33 to pass thru welded spot 32 is not as great as is the tendency for the current introduced at point 34, because the path from point 33 to welded spot 32 is relatively much longer than the path from point 33 to spot being welded 31, while the path from point 34 to welded spot 32 is very little longer than the path from point 34 to spot being welded 31. The conventional method is to introduce all the current at point 34, and the percent of leakage thru welded spot 32 is therefore relatively great.

One form of apparatus for practicing this method is illustrated in Figs. 1 and 2. Cam 1 is designed to be operated by any usual means such as a motor, not shown. The cam 1 is adapted to raise the back end of welder arm 2 thru spring 3 and thus lower the front end of welder arm 2 thru pivot 4. This in turn lowers electrode assembly 5 to the work 6 and 6'. The lower electrode assembly 7 is shown supported in fixed position on the lower arm 8 of the machine. Straps 9 and 9' provide electrical connection to the transformer secondary S of the welding transformer 27.

Both the upper electrode 5 and the lower electrode 7 are made in two main parts, a core 10 and a shell 11, the shell slidable over the core. The core 10 is made of a strong material such as steel to withstand the force of the forging pressure exerted by spring 3 and so as not to offer a low resistance path for the welding current. The shell 11 is made of low resistance material, such as copper, so that it may readily carry the bulk of the welding current.

The core 10 is pressed down on the work by the strong spring 3 to give the necessary forging pressure to the weld while the shell 11 is pressed against the work by the much lighter spring 12 which gives only that pressure necessary to make good electrical contact. Each of these springs is adjustable thru the nuts as shown at 13 and 14. A hooked piece 15 serves to raise shell 11 when the front end of welder arm 2 is raised by spring 16 which acts to return arm 2 to normal position after the welding operation. Water cooling may be provided as shown at 17 and 18 in Fig. 2.

*Operation.*—Operator initiates the welding cycle in any of the usual ways to start cam 1 in operation, this acting thru spring 3 and pivot 4 to lower electrode assembly 5 to the work 6. Shell 11 touches the work first, then springs 12 and 12' are compressed, core 10 touches the work, spring 3 is compressed, and while cam 1 is on its highest point and maximum pressure is being applied to core 10 and shell 11, a lug 19, on cam 1, trips the electric switch mechanism, not shown, to turn on and off the welding current, and the weld is complete. Further turning of cam 1 releases the pressure on spring 3, allows spring 16 to raise core 10, release springs 12 and 12', and thru hook member 15 raise shell 11 from work.

As indicated in Fig. 2 the major portion of the welding current may be made to pass thru shell 11 and enter the work 6 just outside of the spot proper which is formed by the core 10. The current then travels thru the work at a relatively low density and converges at the junction of the pieces of work where it is sufficiently dense to form the weld. The current converges at this point due to the lower resistance where the steel cores 10 and 10' are pressing the pieces together firmly as compared with the resistance opposite the shell contacts, as the pressure on the shells is much lighter than on the cores. The theoretical path of the current is indicated in Fig. 2 by the lines 20.

It is obvious that the relative areas of the core and shell of Fig. 1 may be varied to suit the particular work being handled, and the relative amounts of current handled by each will be dependent upon this factor, the pressures exerted, and the relative resistance of the materials of which each is composed. In this connection, the core may be made of an alloy which has a lower electrical resistance than ordinary steel in order to increase the proportion of current carried by the core, and a direct connection to the secondary leads may be made therefor. Thus any desired division of current between core and shell may be provided for.

In Fig. 1 the shell presents about 8 times the contact area to the work that the core does, but this may be varied to suit particular conditions.

Fig. 3 illustrates a variation of the arrangement just described, and shows an arrangement for passing a portion of the welding current around the roller of a seam welder. In this figure, 21 is a steel or alloy roller for impressing the high forging pressure on the work 6, an arm 22 supporting the roller and shaped as shown to make the whole assembly narrow, this roller 21 corresponding to core 10 of Fig. 1. Arranged immediately alongside are two copper rollers 23 and 23' supported by the forked arm 24. These rollers correspond to the shell 11 of Fig. 1. Rollers 23 and 23' are of larger diameter than roller 21 so as to permit them to be recessed as at 25 and 25' to give clearance for the forked portion of arm 22 and yet bring them close to the roller 21. This construction is necessary so that the copper current carrying rollers 23 and 23' may be mounted separately from the steel roller 21 and a lighter pressure used thereon. Current may be fed to all three rollers in the usual manner and their respective resistances varied as above stated for the spot-welder electrode to get the current distribution desired for the particular work at hand. The theoretical path of the current in the work is the same as for the spot-welder.

It is understood that the means for introducing part of the welding current into the work separate from the forging electrode may be in any one of numerous forms without departing from the spirit of the invention as in certain work the extra current carrying means may need to be made in other shapes than annular as shown here, or may need to be split vertically in several sections to adapt itself to the contour of the work, or may even be made of a flexible material and form to best serve its purpose. It is obvious that the desired condition in the shell-work contact is good electrical contact with low mechanical pressure.

Also, in seam welding, when the spots or stitches are close together, trouble is sometimes experienced due to a tendency for a part of the welding current to flow back thru the last welded spot rather than directly thru the work from electrode to electrode. This is due to the low resistance offered by the welded contact at the last spot compared with the contact resistance between the pieces where the weld is in the process of being made, especially where an oxide coating exists on the surfaces of the work as this further increases the difference in resistance between the two paths mentioned. This tendency can be counteracted in the herein described equipment by advancing the current carrying rollers 23 and 23' a very slight distance ahead of the forging roller 24.

What I claim is:

1. The method of electric resistance welding consisting of applying normal mechanical forging pressure to the work thru one set of electrodes and applying at least a portion of the welding current to the work thru other electrodes exerting a lower mechanical pressure.

2. The method of electrically spot-welding overlapping sheets of material which consists of applying the necessary forging pressure to at least one of the outer surfaces of the work over an area thereof as small as is consistent with the mechanical strength of the material being welded whereby the heating effect is concentrated in a minimum area of the inner surfaces of the work, and applying welding current to that same outer surface of the work at a substantially even density over a substantially larger surface area which is of sufficient extent to reduce the said current density below that value which would produce detrimental heating effects at the said outer surface, said larger area being immediately adjacent to, and including the said forging area, said larger area and said forging area receiving current from the same circuit terminal.

3. That method of electric resistance welding together overlapping sheets of material which comprises applying the forging pressure to a relatively small area only of at least one of the outer surfaces of the work, and applying the welding current at approximately even density to a substantially larger area of that same outer surface immediately adjacent to, and including said forging area, said larger area and said forging area receiving current from the same circuit terminal.

4. The method of spot-welding overlapping sheets of material wherein the application of the welding current to at least one of the outer surfaces of the work is made to a substantially circular area of said outer work surface at an evenly distributed density, said area being of sufficient extent to reduce the current density below that value which produces detrimental heating effects at said outer surface of work, and wherein the necessary forging pressure applied to that same side of the work is confined to a relatively small area thereof and in substantially the center of the said current area, with current from the same circuit terminal supplied to both said circular area and to said relatively small forging area.

5. The method of electric resistance line welding of overlapping sheets of material wherein the means supplying the forging pressure to at least one of the outer surfaces of the work is caused to have contact with a relatively small area of said work surface and to introduce into said small area a predetermined portion only of the necessary welding current, and wherein the remaining portion of the welding current is introduced into that same outer work surface by separate current-carrying means exerting substantially less mechanical pressure on the work than said forging means, said current-carrying means being positioned slightly in advance of the forging means as the combination moves over the work whereby the tendency for that portion of the current which is introduced by said current-carrying means to flow back thru the previously welded portion of the work is lessened due to the increased length of path thereby provided.

6. The method of electric spot and seam welding wherein a portion only of the welding current from at least one circuit terminal is applied to an outer surface of the work in the usual manner thru an electrode exerting the forging pressure, while the balance of the necessary welding current from that same circuit terminal is applied to that same outer work surface immediately adjacent the said forging area thru means exerting a lower mechanical pressure.

7. The method of electric resistance welding wherein the current from at least one circuit terminal is divided where it enters the outer surface of the work, the forging electrode contacting said work surface carrying a predetermined portion only of said current, the balance of the necessary welding current from the same circuit terminal being carried by a separate electrode contacting the same work surface immediately adjacent the said forging electrode and exerting a lower mechanical pressure on work than the said forging electrode.

8. The method of electric spot and line welding which consists of limiting the amount of welding current flowing across the junction between the forging electrode and the outer surface of the work to a value sufficiently low to prevent detrimental heating effects at said junction, and introducing the balance of the necessary welding current from the same circuit terminal into that same outer work surface immediately adjacent the said forging electrode by means exerting a lower mechanical pressure than the said forging electrode.

9. The method of electric resistance seam welding which consists of applying normal mechanical forging pressure and a predetermined portion only of the welding current to either side of the seam opposite the point being welded thru one set of electrodes, and applying the balance of the necessary welding current to the work thru auxiliary electrodes exerting a lower mechanical pressure, each of said auxiliary electrodes being positioned closely adjacent the forging electrode of same polarity and opposite the as yet unwelded portion of the seam whereby the leakage of current thru the previously welded portion of the seam is reduced.

10. In electric line and spot welding, the method of preventing detrimental heating effects at the outer surface of the work which consists of dividing the current from at least one circuit terminal where said current enters the outer surface of the work, passing a predetermined portion only of said current to the work thru the electrode exerting the forging pressure, and passing the balance of the necessary welding current from that same circuit terminal to that same outer work surface thru a separate electrode exerting a lower mechanical pressure than said forging pressure and located immediately adjacent thereto.

11. In electric resistance welding, the method of preventing detrimental heating effects at the junction between the forging electrode and the work surface it contacts, which consists of limiting to a predetermined value the welding current crossing said junction, and by-passing around said junction the balance of the welding current from the same circuit terminal thru an auxiliary electrode exerting substantially less mechanical pressure on the work than the said forging electrode.

12. In electric resistance spot and line welding, the method of preventing detrimental heating effects at the junction between the outer surface of the work and at least one of the electrodes which consists of reducing the electrical resistance of that junction by increasing substantially the area of electrical contact thereat under relatively low mechanical pressure, while confining the necessary higher mechanical forging pressure to a much smaller area of said junction.

JESSE J. BROWN.